United States Patent
Murrell et al.

(10) Patent No.: US 11,321,108 B2
(45) Date of Patent: May 3, 2022

(54) USER INTERFACE FOR MANAGING A DISTRIBUTED VIRTUAL SWITCH

(71) Applicant: VMware, Inc., Palo Alto, CA (US)

(72) Inventors: Kathryn Murrell, San Francisco, CA (US); Karen Natalie Wong, Los Gatos, CA (US)

(73) Assignee: VMware, Inc., Palo Alto, CA (US)

(*) Notice: Subject to any disclaimer, the term of this patent is extended or adjusted under 35 U.S.C. 154(b) by 406 days.

(21) Appl. No.: 15/256,480

(22) Filed: Sep. 2, 2016

(65) Prior Publication Data

US 2016/0371112 A1 Dec. 22, 2016

Related U.S. Application Data

(63) Continuation of application No. 13/022,100, filed on Feb. 7, 2011, now abandoned.

(60) Provisional application No. 61/334,214, filed on May 13, 2010.

(51) Int. Cl.
  *G06F 9/455* (2018.01)
  *G06F 9/50* (2006.01)
  *G06F 3/0482* (2013.01)

(52) U.S. Cl.
  CPC ........ *G06F 9/45558* (2013.01); *G06F 3/0482* (2013.01); *G06F 9/5077* (2013.01); *G06F 2009/45595* (2013.01)

(58) Field of Classification Search
  CPC ... H04L 41/0893; H04L 49/70; H04L 49/354; H04L 12/4641–4695; G06F 3/048; G06F 9/45558; G06F 9/5061–5077; G06F 2009/45562–45595;

(Continued)

(56) References Cited

U.S. PATENT DOCUMENTS

| | | |
|---|---|---|
| 7,111,086 B1 | 9/2006 | Ecoleston et al. |
| 8,639,783 B1 | 1/2014 | Bakke et al. |
| 2004/0158780 A1 | 8/2004 | Conrad |

(Continued)

OTHER PUBLICATIONS

Lowe, William J. "Vmware Infrastructure for Dummies." Wiley Publishing, Inc., 2008.*

(Continued)

*Primary Examiner* — Liang Y Li
(74) *Attorney, Agent, or Firm* — Patterson & Sheridan, LLP

(57) ABSTRACT

A user interface for managing allocations of network resources in a virtualized computing environment provides a graphical overview of the virtual computing environment that allows the user to visualize the virtual network, including the connections between the virtual network adapters and the uplink port groups that provide physical network resources for the virtual machines included in the virtualized computing environment. The user interface also provides graphical elements that allow the user to modify the virtual network, to migrate virtual machines from individual virtual switches to a distributed virtual switch, and/or to modify the arrangement of physical network adapters that provide network backing for the virtual machines. By providing these features, the user interface according to one or more embodiments of the present invention can allow the user to efficiently and safely manage the virtual network in the virtual computing environment.

19 Claims, 14 Drawing Sheets

(58) Field of Classification Search
CPC ..... G06F 9/45533–45558; G06F 9/455; G06F 3/0482
See application file for complete search history.

(56) References Cited

U.S. PATENT DOCUMENTS

| | | | |
|---|---|---|---|
| 2007/0283286 A1 | 12/2007 | Ashok et al. | |
| 2008/0114781 A1 | 5/2008 | Yin et al. | |
| 2008/0163232 A1* | 7/2008 | Walrath | G06F 9/5011 718/104 |
| 2009/0292558 A1 | 11/2009 | Kramer et al. | |
| 2010/0064225 A1* | 3/2010 | Cunningham | H04L 41/12 715/736 |
| 2010/0083245 A1* | 4/2010 | DeHaan | G06F 9/4411 717/177 |
| 2010/0097641 A1 | 4/2010 | Takeshita | |
| 2010/0097926 A1 | 4/2010 | Huang et al. | |
| 2010/0128432 A1* | 5/2010 | Miller | G06F 1/20 361/679.54 |
| 2010/0138830 A1 | 6/2010 | Astete et al. | |
| 2010/0257263 A1* | 10/2010 | Casado | H04L 45/66 709/223 |
| 2011/0119381 A1* | 5/2011 | Glover | G06F 9/5072 709/226 |
| 2011/0167421 A1* | 7/2011 | Soundararajan | G06F 9/45533 718/1 |
| 2011/0209145 A1 | 8/2011 | Chen et al. | |
| 2011/0255538 A1 | 10/2011 | Srinivasan et al. | |
| 2011/0321045 A1 | 12/2011 | Takemura | |

OTHER PUBLICATIONS

"VMware Infrastructure 3 in a Cisco Network Environment". DCisco Systems, 2008. (Year: 2008).*

VMware. "VMware vNetwork Distributed Switch: Migration and Configuration". Aug. 11, 2009. https://www.vmware.com/techpapers/2009/vmware-vnetwork-distributed-switch-migration-and-10050.html (Year: 2009).*

Cisco. "Getting Started with QPM". Nov. 12, 2002. <https://docstore.mik.ua/univercd/cc/td/doc/product/rtrmgmt/qos/qpm21/qpm21ug/ugtut.htm> (Year: 2002).*

Fay-Wolfe, Vic. "How Computers Work: Disks and Secondary Storage". University of Rhode Island. Mar. 14, 2005. <https://web.archive.org/web/20050314153448/https://homepage.cs.uri.edu/faculty/wolfe/book/Readings/Reading05.htm> (Year: 2005).*

Lowe, Scott. "Mastering VMware vSphere 4", Section 5.3 "Working with vNetwork Distributed Switches". Wiley. Sep. 2009. (Year: 2009).*

S Sloof, Eric. "NTPRO Archives." Archive. N.p., n.d. Web. Jan. 28, 2016. <http://www.ntpro.nl/blog/archives/>.

Lowe, Scott "Mastering VMware vSphere 4." Wiley Publishing, Inc. Ch. 5, pp. 182-196 (2009).

Sloof, Eric, video available on http://www.ntpro.ni/blog/archives/1089-Distributed-Virtuai-Port-Groups-and-Distributed-Virtual-Uplinks.html, Duration: 24 seconds, Posted on Apr. 27, 2009, retrieved from Internet Archive(https://web.archive.org) on May 23, 2009.

Lowe, William J. "VMware Infrastructure 3 for Dummies." Wiley Publishing, Inc. Ch. 7, pp. 95-118 (2008).

Vmware, "What's new in VMware vSphereTM 4: Virtual networking", White Paper, 2009.

* cited by examiner

USER INTERFACE FOR MANAGING A DISTRIBUTED VIRTUAL SWITCH

CROSS-REFERENCE TO RELATED APPLICATIONS

This application is a Continuation of U.S. patent application Ser. No. 13/022,100 filed Feb. 7, 2011, which claims the benefit of U.S. provisional patent application Ser. No. 61/334,214, filed on May 13, 2010, the entire contents of which are incorporated by reference herein.

BACKGROUND

Computer virtualization is a technique that involves encapsulating a physical computing machine platform into a virtual machine that is executed under the control of virtualization software running on a single hardware computing platform (also referred to herein as "host system" or "host computer"). A group of hardware computing platforms may be organized as a cluster to provide the hardware resources for virtual machines. In a data center that employs virtual machines, it is common to see hundreds, even thousands, of virtual machines running on multiple clusters of host systems.

A virtualization management software is used by an administrator to manage the configuration of the virtual machines and the allocation of computing resources to the virtual machines. Because of the large number of virtual machines to be managed within a single data center, and sometimes, across multiple data centers, some of the administrator's tasks are automated. For example, software automated techniques such as dynamic resource scheduling and dynamic power management have been developed to assist the administrator in balancing workloads across host systems and powering host systems ON and OFF as needed.

One feature of the virtualized computing environment that is controlled by the virtualization management software is virtual networking. Each virtual machine includes a software-based virtual network adapter that is logically connected to a physical network adapter included in a host computer that provides network access for the virtual machine. The virtual network adapter is connected to the physical network adapter through a software-based "switch." However, when a large number of virtual machines is included in the virtual computing environment, managing the virtual network connections can become time consuming and error prone for the administrator.

Accordingly, there remains a need in the art for a user interface for managing a virtualized computing environment that addresses the drawbacks and limitations discussed above.

SUMMARY

One or more embodiments of the invention provide a user interface for managing allocations of network resources in a virtualized computing environment. The user interface provides a graphical overview of the virtual computing environment that allows the user to visualize the virtual network, including the connections between the virtual network adapters and the uplink port groups that provide physical network resources for the virtual machines included in the virtualized computing environment. The user interface also provides graphical elements that allow the user to modify the virtual network, to migrate virtual machines from individual virtual switches to a distributed virtual switch, and/or to modify the arrangement of physical network adapters that provide network backing for the virtual machines. By providing these features, the user interface according to one or more embodiments of the present invention can allow the user to efficiently and safely manage the virtual network in the virtual computing environment.

One embodiment provides a technique for managing networking resources in a virtualized computing environment that includes associating one or more uplink port groups with a distributed virtual switch that is logically connected to two or more host computers; associating one or more physical network adapters included in the two or more host computers with each of the one or more uplink port groups; and establishing a logical connection between one or more virtual machines executing on the two or more host computers and the one or more uplink port groups.

DETAILED DESCRIPTION

Figure 1A:
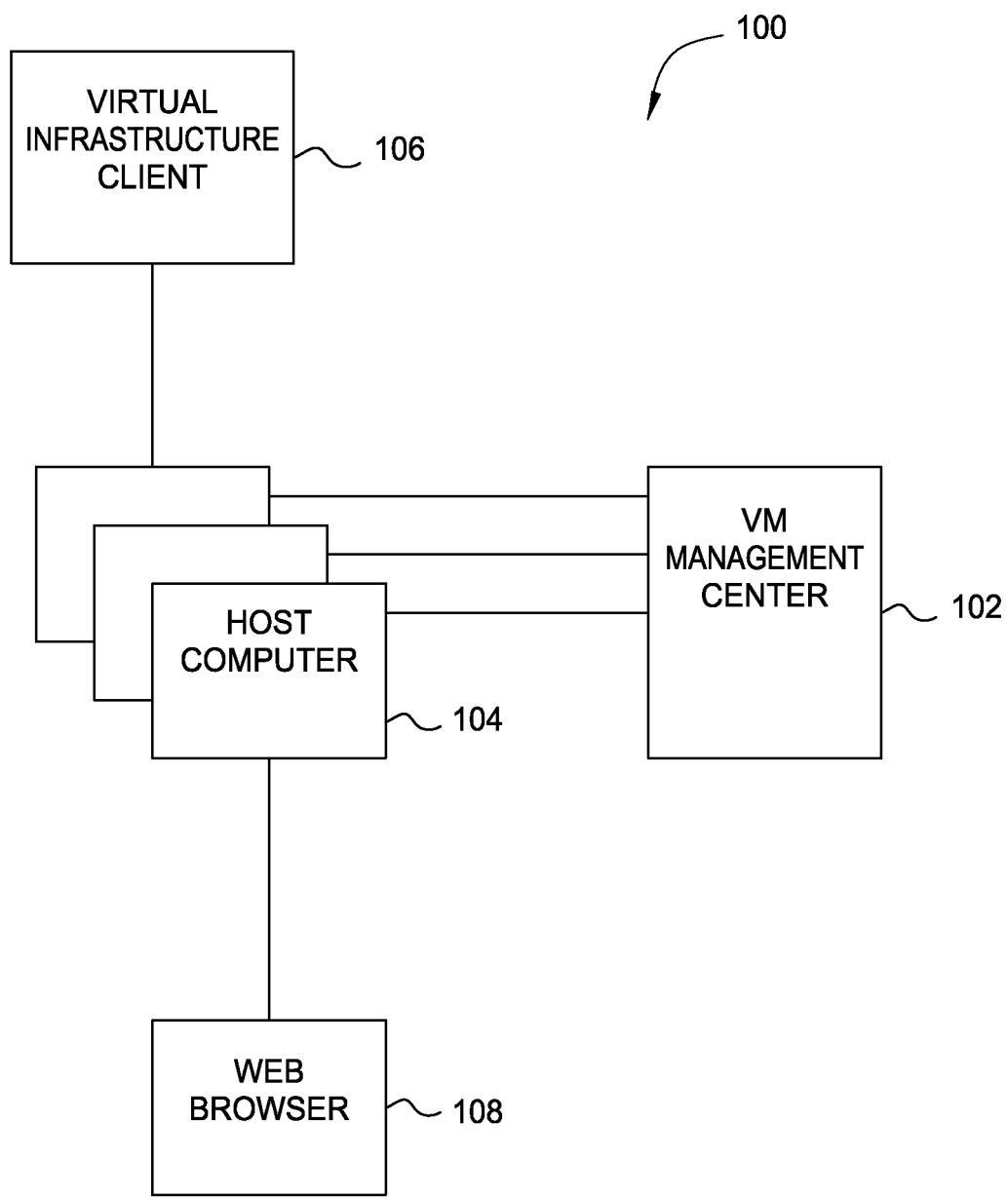
FIG. 1A depicts a block diagram of a virtualized computer system in which one or more embodiments of the present invention may be practiced.

FIG. 1A depicts a block diagram of a virtualized computer system 100 in which one or more embodiments of the present invention may be practiced. Host computers 104 (also referred to herein as "servers") are configured to deliver virtualization-based distributed services to information technology environments. Each host computer 104 provides a virtualization layer that abstracts processor, memory, storage, and/or networking resources into multiple virtual machines that run side-by-side on the same physical host computer 104. In one embodiment, virtualization software can be installed directly on the server hardware and inserts a virtualization layer between the hardware and the operating system. The virtualization software partitions a physical host computer 104 into multiple secure and portable virtual machines that run on the same physical server. Each virtual machine represents a complete system—with processors, memory, networking, storage, and/or BIOS.

A virtual machine (VM) management center 102 is also included in the system 100. The VM management center 102 manages the virtual infrastructure, including managing the host computers 104, the virtual machines running within each host computer 104, provisioning, migration, resource allocations, and so on.

According to various embodiments, implementing a virtualized system simplifies management with a management application, such as the Virtual Infrastructure (VI) Client 106, that can be used to perform tasks. Each server configuration task, such as configuring storage and network connections or managing the service console, can be accomplished centrally through the VI Client 106. One embodiment provides a stand-alone application version of the VI Client 106. In another embodiment, a web browser application 108 provides virtual machine management access from any networked device. For example, with the browser version of the client 108, giving a user access to a virtual machine can be as simple as providing a URL (Uniform Resource Locator) to the user.

According to some embodiments, user access controls of the VM management center 102 provide customizable roles and permissions so an administrator can create roles for various users by selecting from an extensive list of permissions to grant to each role. Responsibilities for specific virtualized infrastructure components, such as resource pools, can be delegated based on business organization or ownership. VM management center 102 can also provide full audit tracking to provide a detailed record of every action and operation performed on the virtual infrastructure. As described in greater detail herein, embodiments of the invention provide a user interface for the VI Client 106 that allows a user to manage a distributed virtual switch (DVS).

Figure 1B:
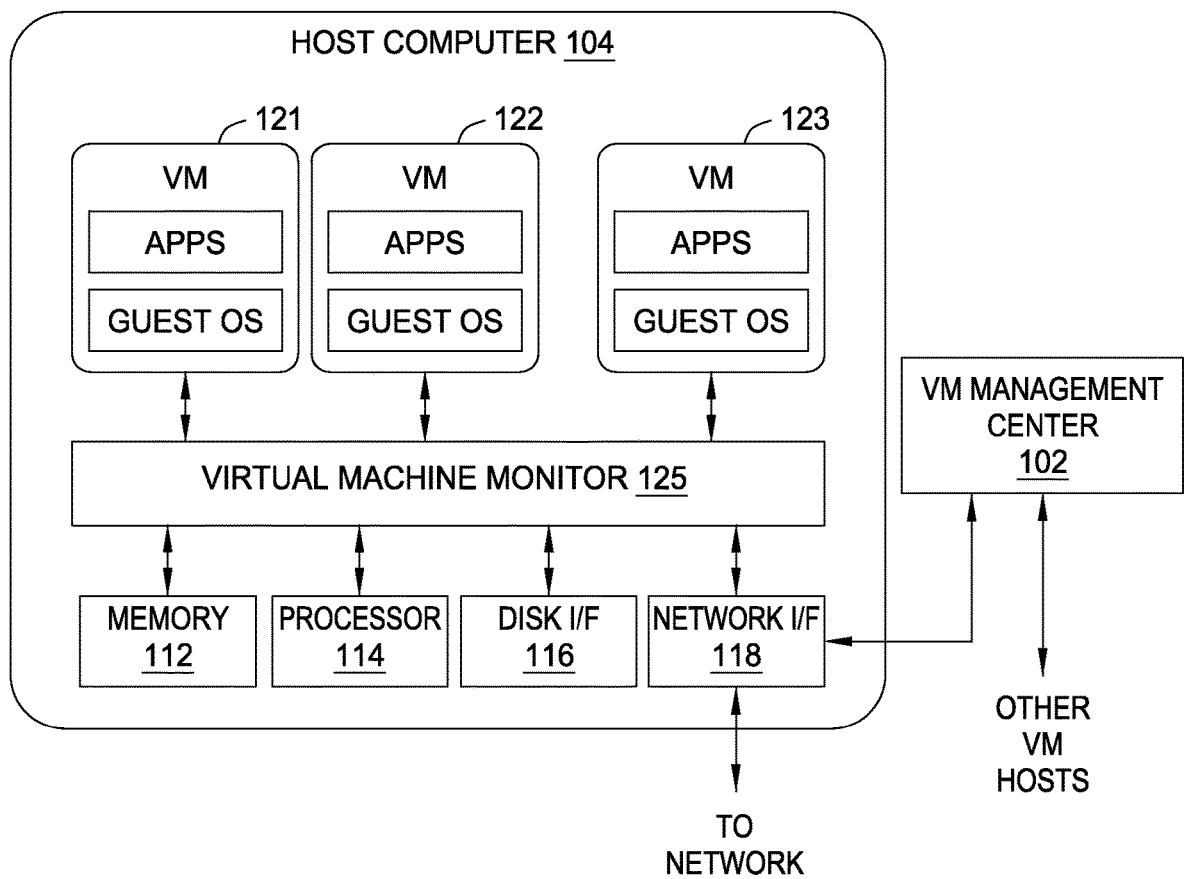
FIG. 1B depicts a block diagram of a host computer and virtual machine (VM) management center, according to one embodiment of the invention.

FIG. 1B depicts a block diagram of a host computer 104 and VM management center 102, according to one embodiment of the invention. A virtualized environment includes a host computer 104 that has conventional components of a computing device, and may be implemented within a cluster of computing devices. One or more virtual machines are configured within the host computer 104, represented in FIG. 1B as VM 121, VM 122, and VM 123, that share hardware resources of host computer 104, such as system memory 112, processor 114, disk interface 116, and network interface 118. Examples of disk interface 116 are a host bus adapter and a network file system interface. An example of network interface 118 is a network adapter, also referred to as a Network Interface Card (NIC). In some embodiments, a plurality of NICs is included in the network interface 118.

The virtual machines VM 121-123 run on top of a virtual machine monitor 125, which is a software interface layer that enables sharing of the hardware resources of host computer 104 by the virtual machines. Virtual machine monitor 125 may run on top of the operating system of the host computer 104 or directly on hardware components of the host computer 104. In some embodiments, virtual machine monitor 125 runs on top of a hypervisor that is installed on top of the hardware resources of host computer 104. Together, the virtual machines 121-123 and virtual machine monitor 125 create virtualized computer systems that give the appearance of being distinct from host computer 104 and from each other. Each virtual machine includes a guest operating system and one or more guest applications. The guest operating system is a master control program of the virtual machine and, among other things, the guest operating system forms a software platform on top of which the guest applications run.

In one embodiment, data storage for host computer 104 is served by a storage area network (SAN) (not shown), which includes a storage array (e.g., a disk array) and a switch (SAN fabric) that connects host computer 104 to storage array 160 via the disk interface 116. In virtualized computer systems, in which disk images of virtual machines are stored in the storage arrays, disk images of virtual machines can be migrated between storage arrays as a way to balance the loads across the storage arrays. For example, the Storage VMotion™ product that is available from VMware Inc. of Palo Alto, Calif. allows disk images of virtual machines to be migrated between storage arrays without interrupting the virtual machine whose disk image is being migrated or any applications running inside it. In other embodiments, any technically feasible data storage implementation, other than a SAN, can be used to provide storage resources for host computer 104.

Figure 2:
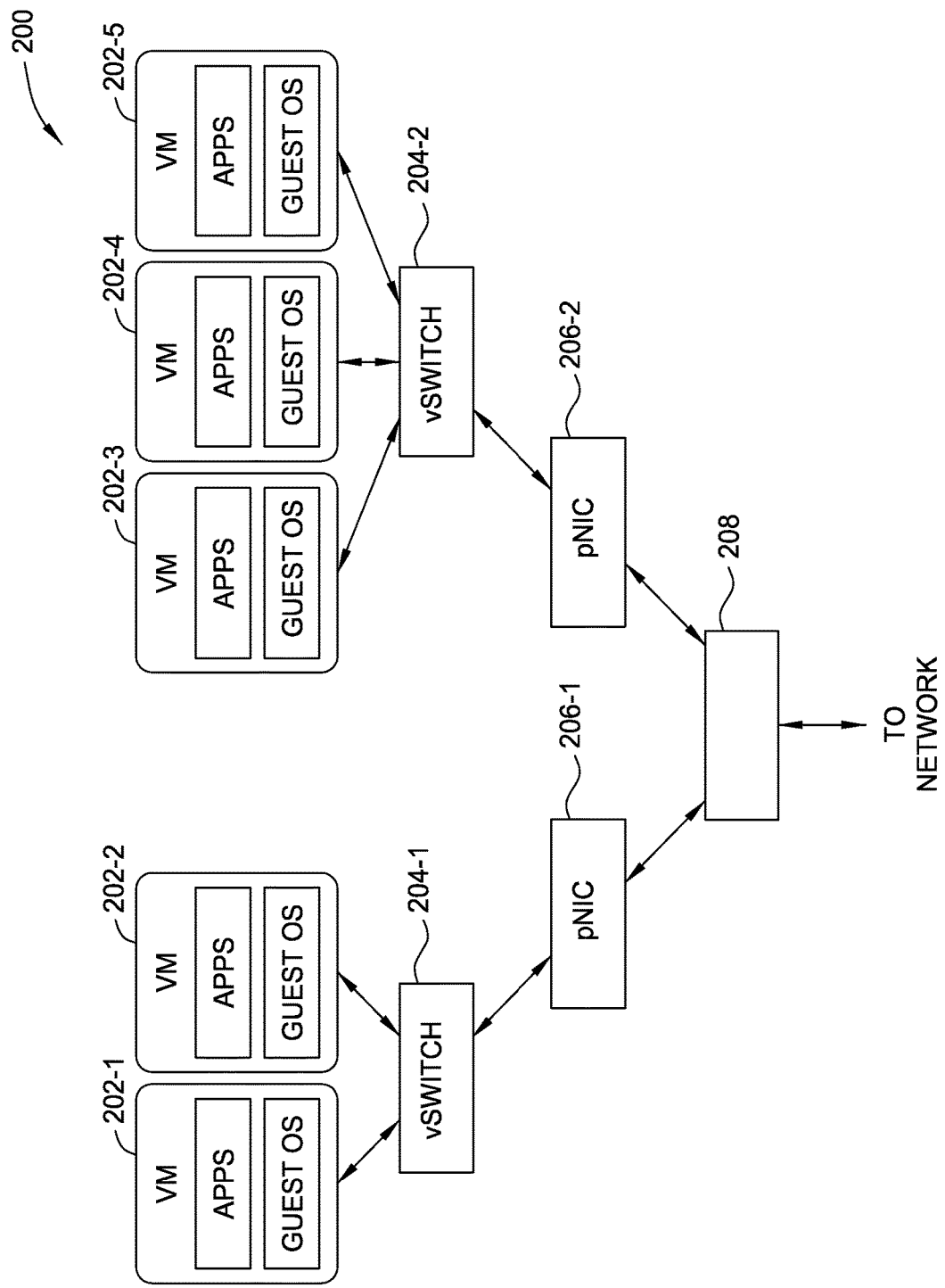
FIG. 2 depicts a networking architecture that includes multiple virtual switches, according to one embodiment of the invention.

FIG. 2 depicts a networking architecture 200 that includes multiple virtual switches 204-1, 204-2, according to one embodiment of the invention. As shown, VMs 202-1, 202-2 are logically connected to a virtual switch, or "vSwitch," 204-1, which is, in turn, logically connected to a physical network interface card (pNIC) 206-1 included in a host computer. Similarly, VMs 202-3, 202-4, 202-5 are logically connected to vSwitch 204-2, which is, in turn, logically connected to pNIC 206-2 included in a host computer. In one embodiment, pNICs 206-1 and 206-2 are included in the same host computer. In another embodiment, pNICs 206-1 and 206-2 are included in different host computers. The pNICs 206-1, 206-2 can communicate with one another and with the outside world via router or switch 208.

Virtual switches 204-1, 204-2 are software-based devices that exist in the virtual machine kernel on the respective host computer. A virtual switch is a software construct of a physical switch that allows multiple entities, such as VMs to communicate with each other and the outside world using a single physical network connection.

Many configuration options exist for virtual switches. A user, such as an administrator, can assign virtual local area networks (VLANs), security profiles, and/or limit the amount of traffic that virtual machines can generate. Additionally, the user can assign multiple physical NICs from the host computer to a virtual switch for load balancing and fault tolerance. As described, each host computer can include one or more NICs, also called "network adapters" or "uplink adapters."

As described, the VMs connect to virtual switches. The virtual switches, in turn, connect to physical NICs in the host computers. The physical NICs connect to the physical network. Virtual switches can have many similarities with physical switches. For example, virtual switches include varying number of ports to connect to VMs, offer support for VLANs, can have varying port speeds, and/or can offer security policies.

In some embodiments, virtual switches perform three different functions for a host computer, including (1) virtual machine connection, (2) VM kernel connection, and (3) a service console. Each of these functions is considered a different connection type or port.

Virtual machine ports connect the VMs with each other and the outside world. Each VM connects to a port on one or more virtual switches. Any physical NICs that are assigned to the virtual switch provide a bridge to the physical network. VM kernel ports connect the VMs to various services, such as networking services, IP (Internet Protocol) storage services, Internet Small Computer System Interface (iSCSI) services, and disk image migrations. The service console port provides access to host computer management services. A VI client can connect to the service console to configure and manage the host computer.

However, several problems arise when using multiple virtual switches, as shown in FIG. 2. One limitation of using multiple virtual switches is that each host computer has to be individually configured to have the proper network settings for VMs to communicate across host computers. For example, if a VM is connected to a first vSwitch coupled to a first host computer, the VM cannot be migrated to a second vSwitch coupled to a second host computer unless the first and second host computers have identical network settings. In one embodiment, configuring a vSwitch includes associating a virtual NIC included in a VM with one or more physical NICs included in the host computer. Typically, this process would need to be performed for each VM. When managing multiple and/or large networks, maintaining identical network settings across many host computer can be time consuming, tedious, and error prone.

Figure 3:
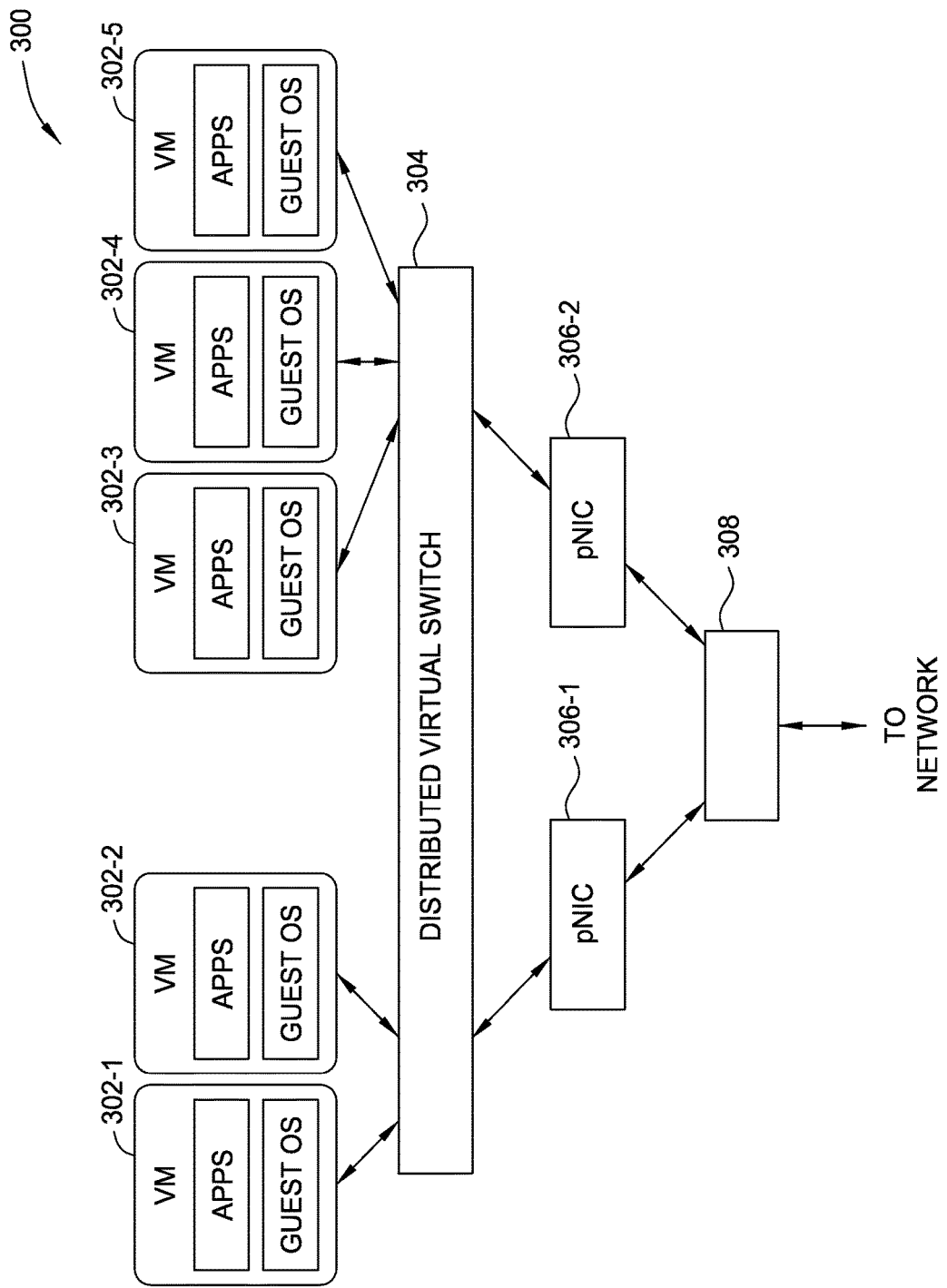
FIG. 3 depicts a networking architecture that includes a distributed virtual switch, according to one embodiment of the invention.

Accordingly, embodiments of the invention provide for a distributed virtual switch that is coupled to multiple host computers. FIG. 3 depicts a networking architecture 300 that includes a distributed virtual switch 304, according to one embodiment of the invention. As shown, VMs 302-1, 302-2, 302-3, 302-4, 302-5 are each coupled to the distributed virtual switch (DVS) 304. The DVS 304 is coupled to pNICs 306-1, 306-2 included in one or more host computers. The pNICs 306-1, 306-2 are coupled to a router or switch 308. The DVS 304 can be also referred to as a "vNetwork distributed switch" or a "vSphere distributed switch."

In some embodiments, a DVS 304, as shown in FIG. 3, is simpler for a user to manage than multiple individual and segregated virtual switches, as shown in FIG. 2. For example, the user can interact with a user interface provided by the VI client 106 to configure the DVS 304. The DVS 304 maintains network runtime state for VMs as they move across multiple hosts, enabling inline monitoring and centralized firewall services. The DVS 304 also provides a framework for monitoring and maintaining the security of the virtual machines as they move from physical server to physical server and enables the use of third party virtual switches to extend familiar physical network features and controls to virtual networks.

Additional features provided by the DVS 304 include, simplified provisioning and administration of virtual networking across many hosts and clusters through a centralized interface, simplified end-to-end physical and virtual network management through third-party virtual switch extensions, enhanced provisioning and traffic management capabilities through private VLAN support and bi-directional virtual machine rate-limiting, enhanced security and monitoring for virtual machines migrations, prioritized controls between different traffic types, and/or load-based dynamic adjustment across a team of physical adapters on the distributed virtual switch.

Figure 4:
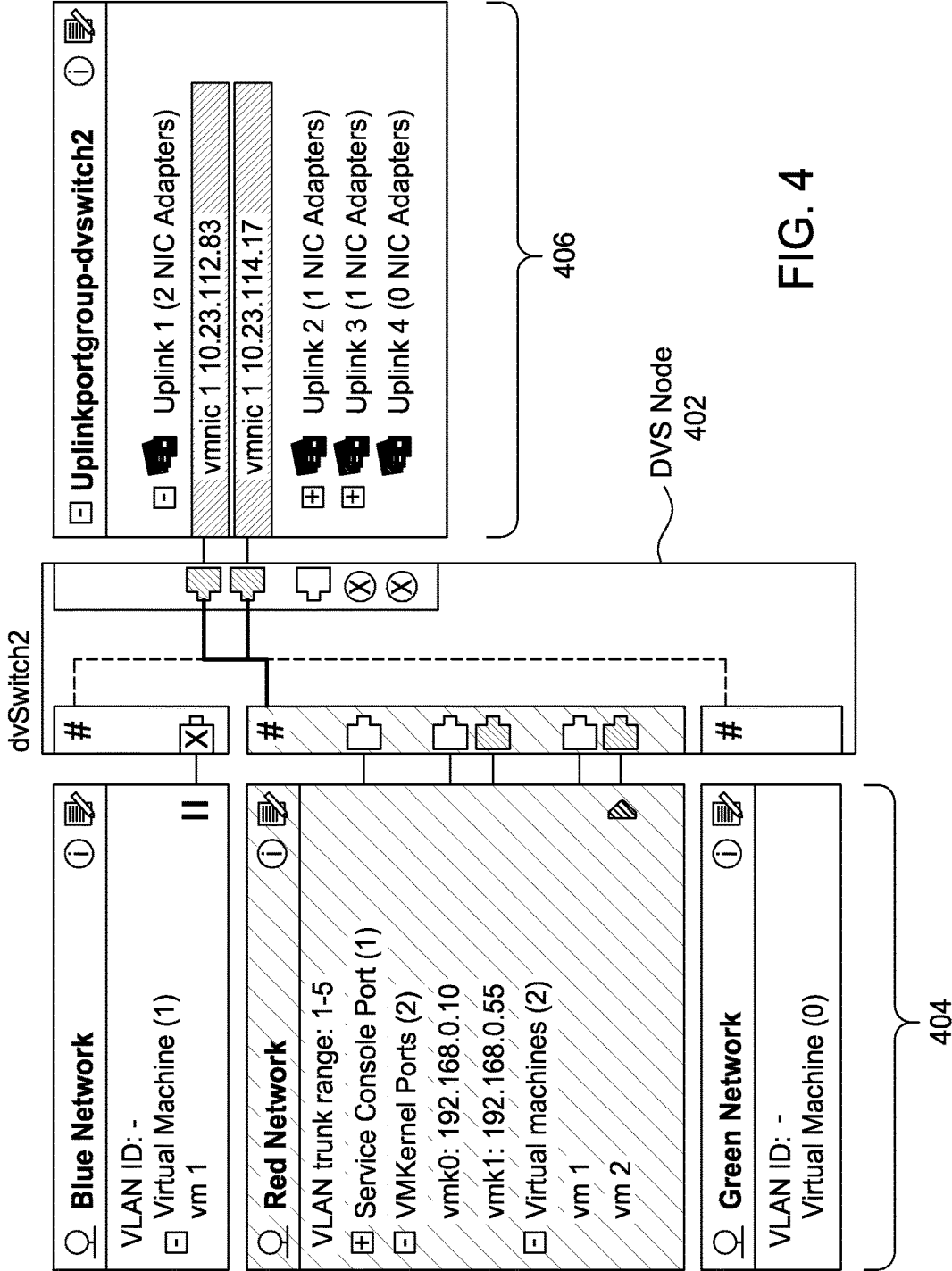
FIG. 4 depicts a user interface for managing a distributed virtual switch (DVS), according to one embodiment of the invention.

FIG. 4 depicts a user interface for managing a distributed virtual switch (DVS), according to one embodiment of the invention. As shown, a DVS node 402 represents the DVS. Virtual adapters, e.g., software constructs included within one or more VMs, are located to the left 404 of the DVS node 402, and physical adapters, e.g., associated with one or more physical NICs included in one or more host computers, are located to the right 406 of the DVS node 402.

In one embodiment, the one or more physical NICs included in the one or more host computers can be organized into "uplinks," also referred to as "uplink ports." An uplink is a set of one or more physical NICs that connect to one or more VMs organized in a virtual network, or VLAN. As shown in the example in FIG. 4, the physical NICs are divided into four uplinks: Uplink 1, Uplink 2, Uplink 3, and Uplink 4. Uplink 1 includes two physical NICs, Uplinks 2 and 3 include one physical NIC, and Uplink 4 includes zero physical NICs. The two physical NICs included in Uplink 1 are both named "vmnic 1." In one example, one of the physical NICs included in Uplink 1 is included in a first host computer, and the other physical NIC included in Uplink 1 is included in a second host computer.

Figure 5:
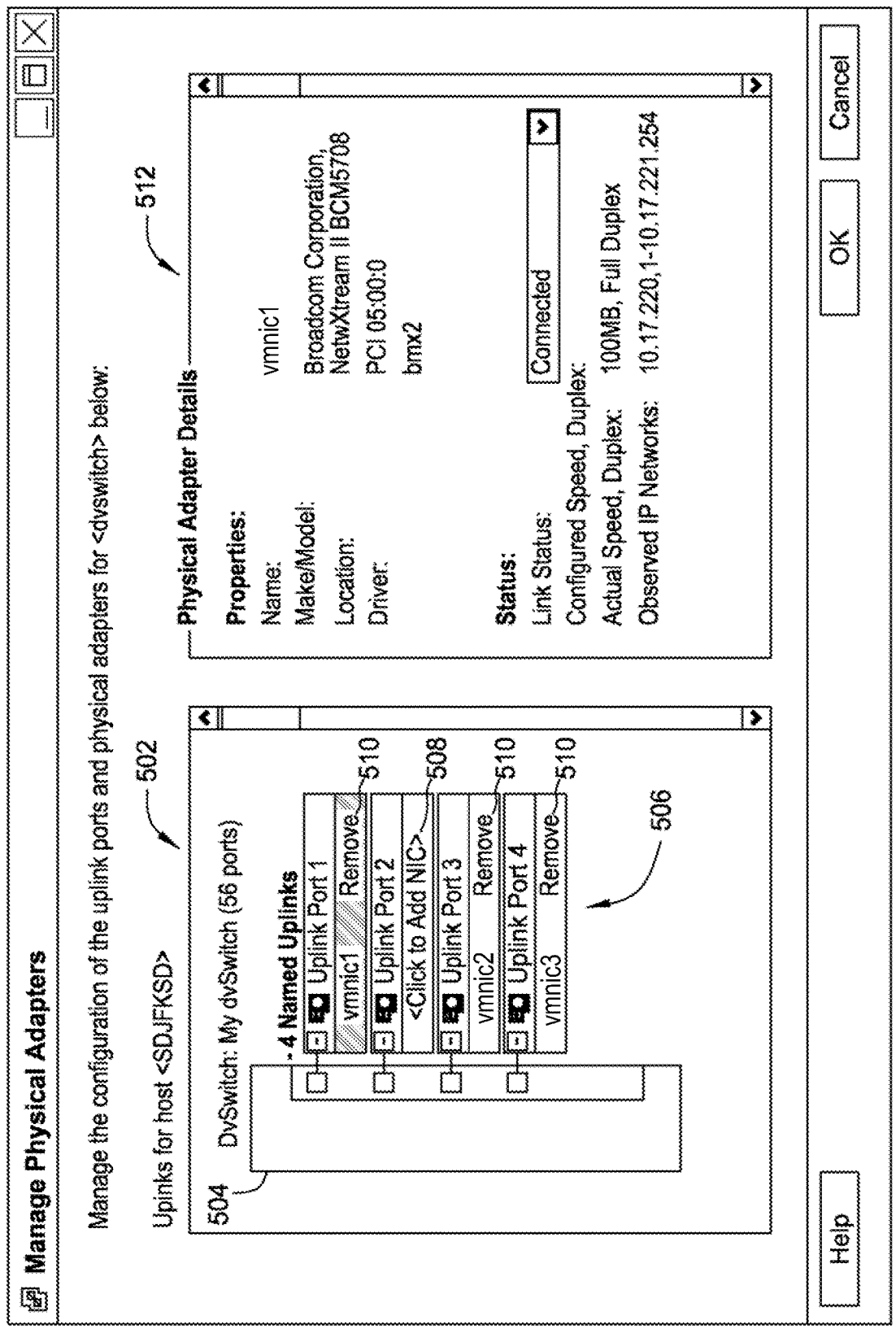
FIG. 5 is a screenshot of a user interface for managing the physical Network Interface Cards (NICs) associated with each of one or more uplinks, according to one embodiment of the invention.

Embodiments of the invention provide a user interface for managing the physical NICs included in each of the uplinks. FIG. 5 is a screenshot of a user interface for managing the physical Network Interface Cards (NICs) associated with each of one or more uplinks, according to one embodiment of the invention. The user interface can include a window 502 that illustrates a high level organization of the DVS 504 and the uplinks 506. In the example shown, there are four uplinks connected to the DVS 504.

In one embodiment, the user interface shown in FIG. 5 conveys to the user the physical NICs included in a particular host computer that have been assigned to the one or more uplinks. As shown, physical NIC "vmnic1" has been assigned to Uplink Port 1, physical NIC "vmnic2" has been assigned to Uplink Port 3, and physical NIC "vmnic3" has been assigned to Uplink Port 4, where each of the physical NIC is included in the same host computer. In the example shown, no physical NICs have been assigned to Uplink Port 2. The user can select a link 508 associated with Uplink Port 2 to assign one of the physical NICs included in the host computer to Uplink Port 2. Accordingly, the user interface provides a mechanism for the user to quickly ascertain whether any of the uplinks have not yet been assigned a physical NIC, as well as a mechanism to assign a physical NIC to the uplink. In addition, the user interface includes remove links 510 that, when selected, remove an association of a physical NIC to the corresponding uplink.

The user interface shown in FIG. 5 also includes a details portion 512. When a user selects a currently-assigned physical NIC, the details of the physical NIC are shown in the details portion 512. In the example shown, the user has selected physical NIC "vmnic1," included within the highlighted box. The details of physical NIC "vmnic1," including the name, make and model, driver version, status, and associated IP addresses, are shown in the details portion 512.

Referring back to FIG. 4, a user can select one of the virtual adapters or one of the physical adapters, and the VI client causes the path through the DVS node 402 to be highlighted. Highlighting the path allows the user to visualize the traffic between the VMs and the physical NICs, port usage, and/or status. These visualizations can be useful for troubleshooting.

Figure 6:
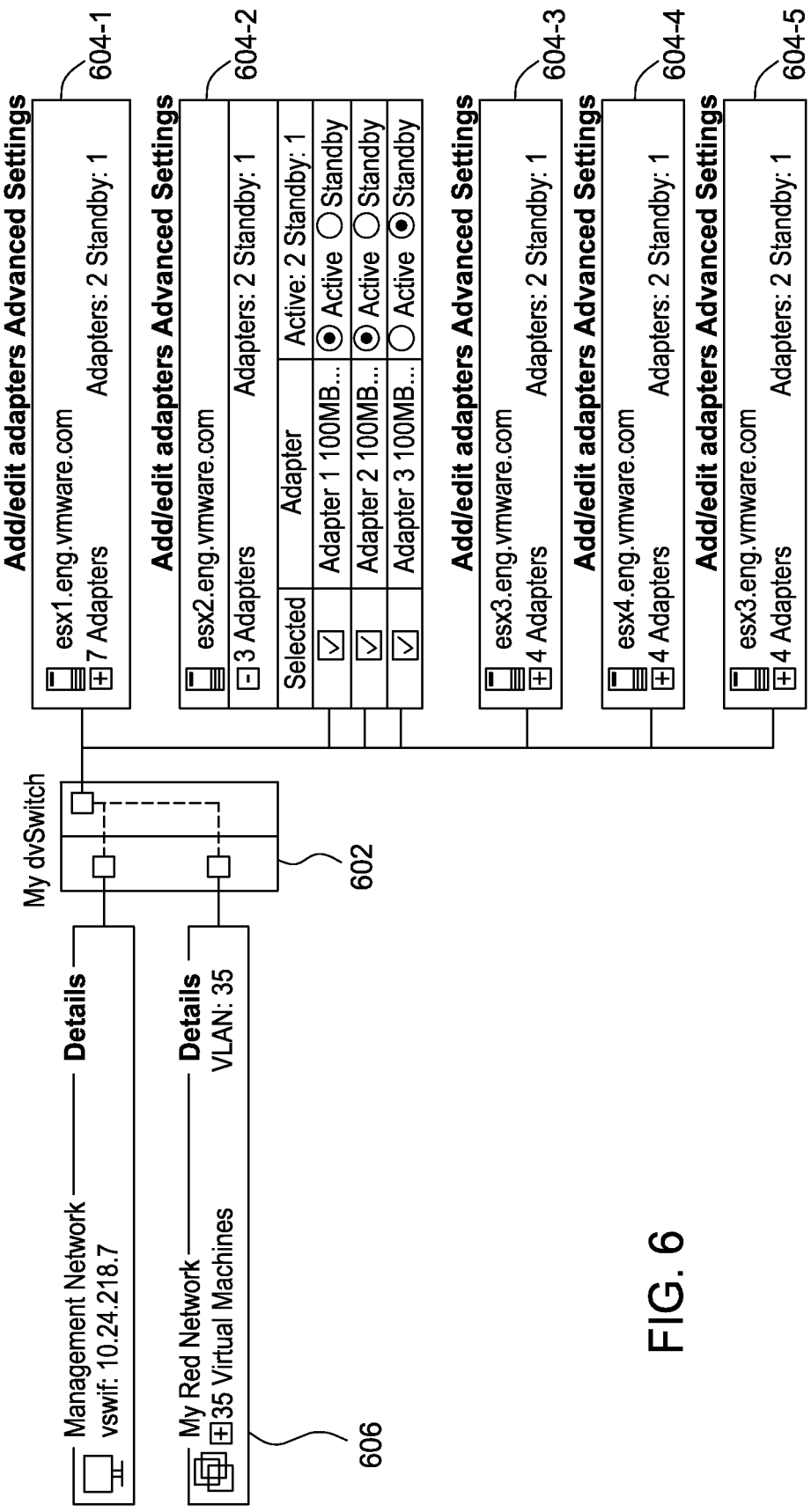
FIG. 6 is a screenshot of a user interface for the physical NICs associated with each of one or more uplinks organized by host computer, according to one embodiment of the invention.

As described, FIG. 4 illustrates a user interface that is organized by uplink port. In another embodiment, the user interface can be organized by host computer. FIG. 6 is a screenshot of a user interface for the physical NICs associated with each of one or more uplinks organized by host computer, according to one embodiment of the invention. As shown, a set of VMs 606 is connected to the DVS 602, which is connected to several host computers 604-1, 604-2, 604-3, 604-4, 604-5. Each host computer can include one or more adapters, i.e., physical NICs. As shown, host computer 604-2 includes three physical NICs. Two of the physical NICs have active status and one physical NIC has standby status. The user interface shown in FIG. 6 allows the user to visualize the various physical NICs and manage the status of the physical NICs.

Figure 7:
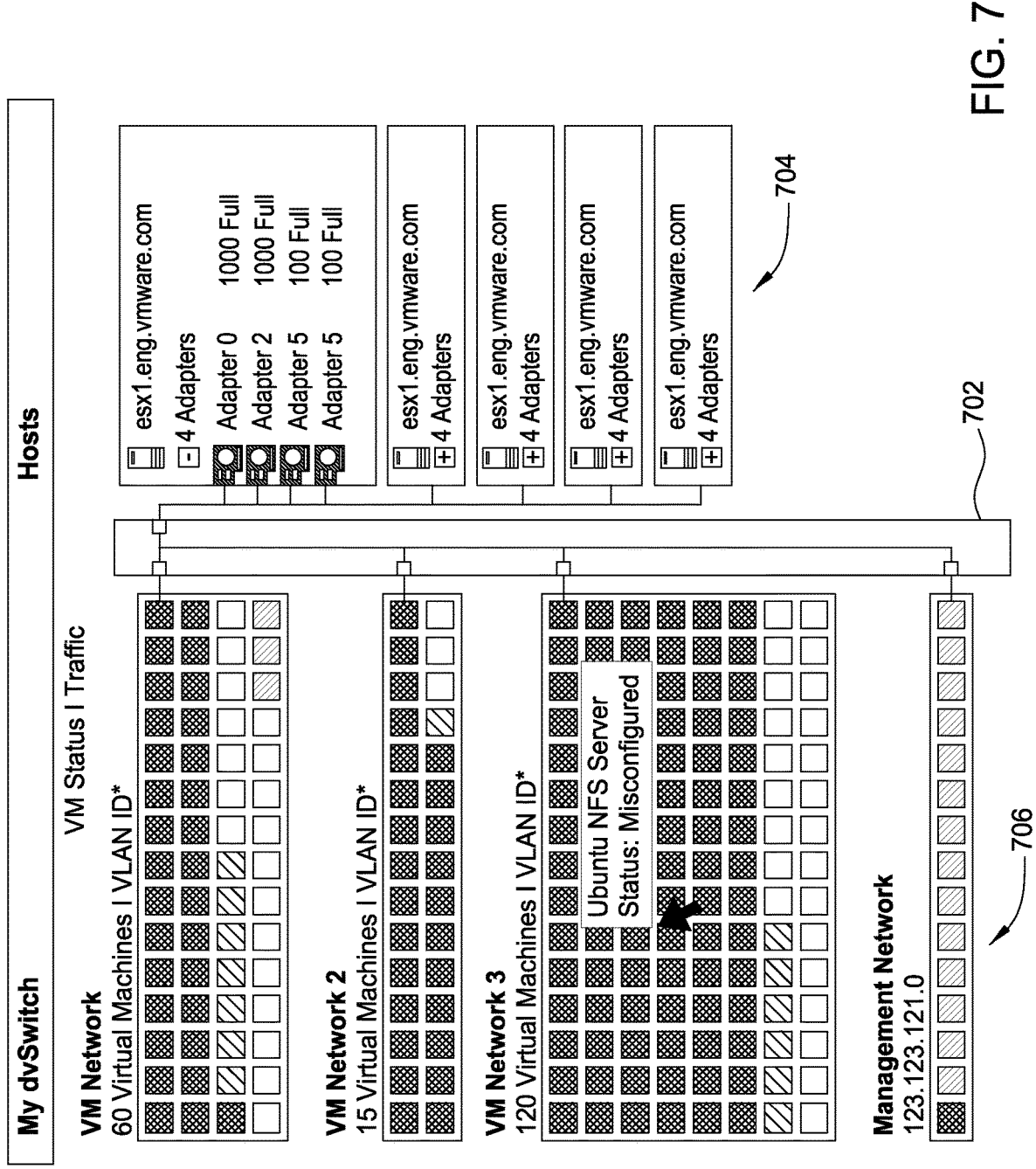
FIG. 7 is a screenshot of a user interface for managing a DVS that includes the status of the various VMs connected to the DVS switch, according to one embodiment of the invention.

In yet another embodiment, the DVS architecture can be displayed in a user interface that shows the "status" of the various VMs connected to the DVS switch. FIG. 7 is a screenshot of a user interface for managing a DVS that includes the status of the various VMs connected to the DVS switch, according to one embodiment of the invention. As shown, a DVS 702 is connected to one or more hosts 704 and one or more VM networks 706. Within each VM network, each VM is displayed as a box. The boxes corresponding to the various VMs can be color coded based on the status of the VM. In one embodiment, the status of the VM can be ON, OFF, BAD, or EMPTY. In yet another embodiment, the VMs included in each VM network can be organized based on network traffic. In this embodiment, the VMs can be color coded based on how much bandwidth the particular VM is consuming.

As described above in FIG. 2, some legacy system may be configured with multiple virtual switches instead of a DVS. Some users may be hesitant to migrate the VMs connected to individual virtual switches to a DVS for fear or causing errors in the network. Embodiments of the invention provide a technique and user interface for quickly and safely migrating VMs from individual virtual switches to a DVS.

Figure 8A:
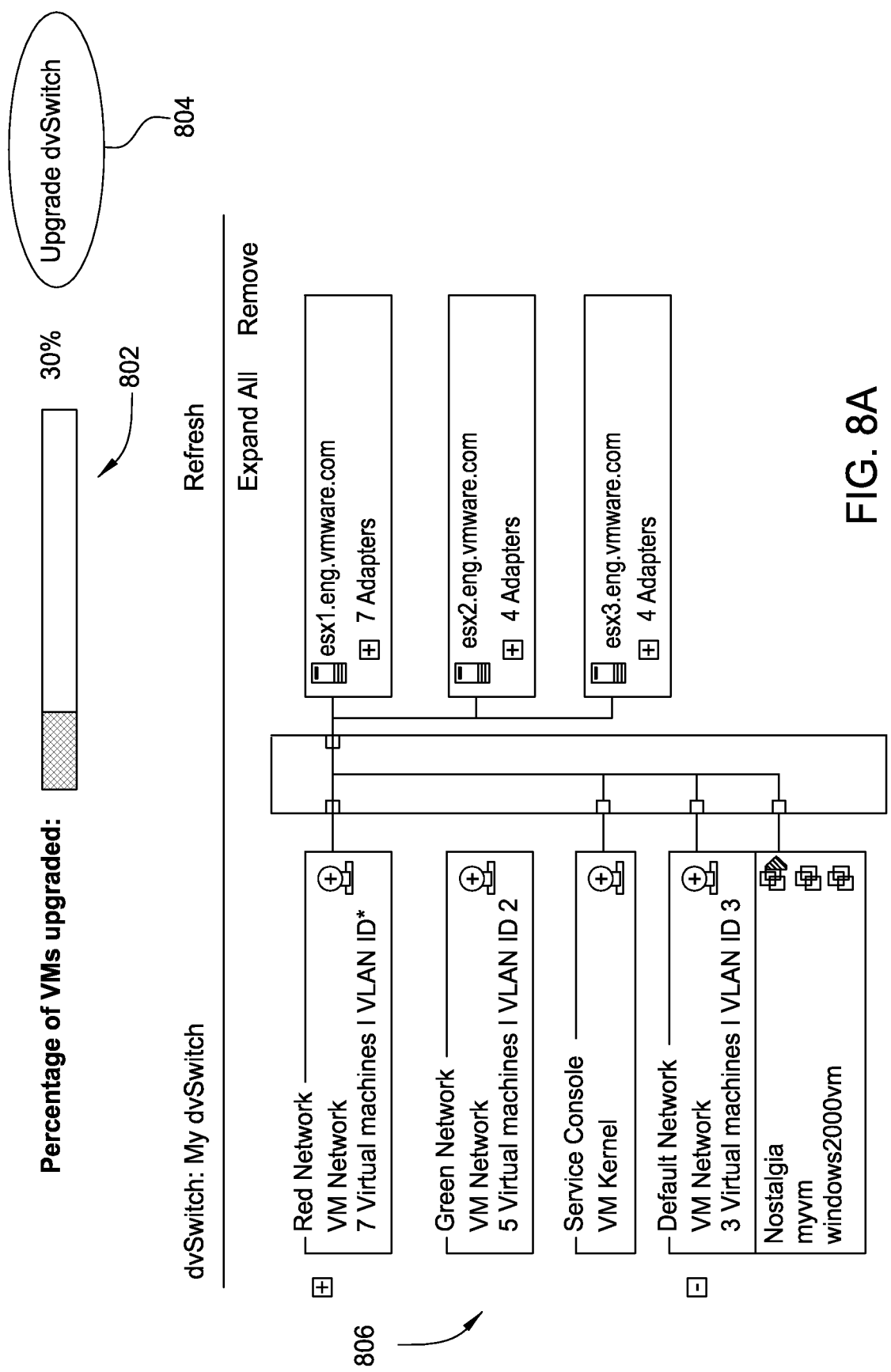
FIG. 8A is a screenshot of a user interface for migrating VMs from individual virtual switches to a DVS, according to one embodiment of the invention.

FIG. 8A is a screenshot of a user interface for migrating VMs from individual virtual switches to a DVS, according to one embodiment of the invention. As shown, the user interface includes an overview 806 of the virtual networking environment. The user interface also includes a status bar 802 that indicates the percentage of VMs in the networking environment that have been migrated from individual virtual switches to the DVS. Displaying the status bar 802 can encourage users to upgrade to the DVS and allow users to migrate the VMs at their own pace.

Figure 8B:
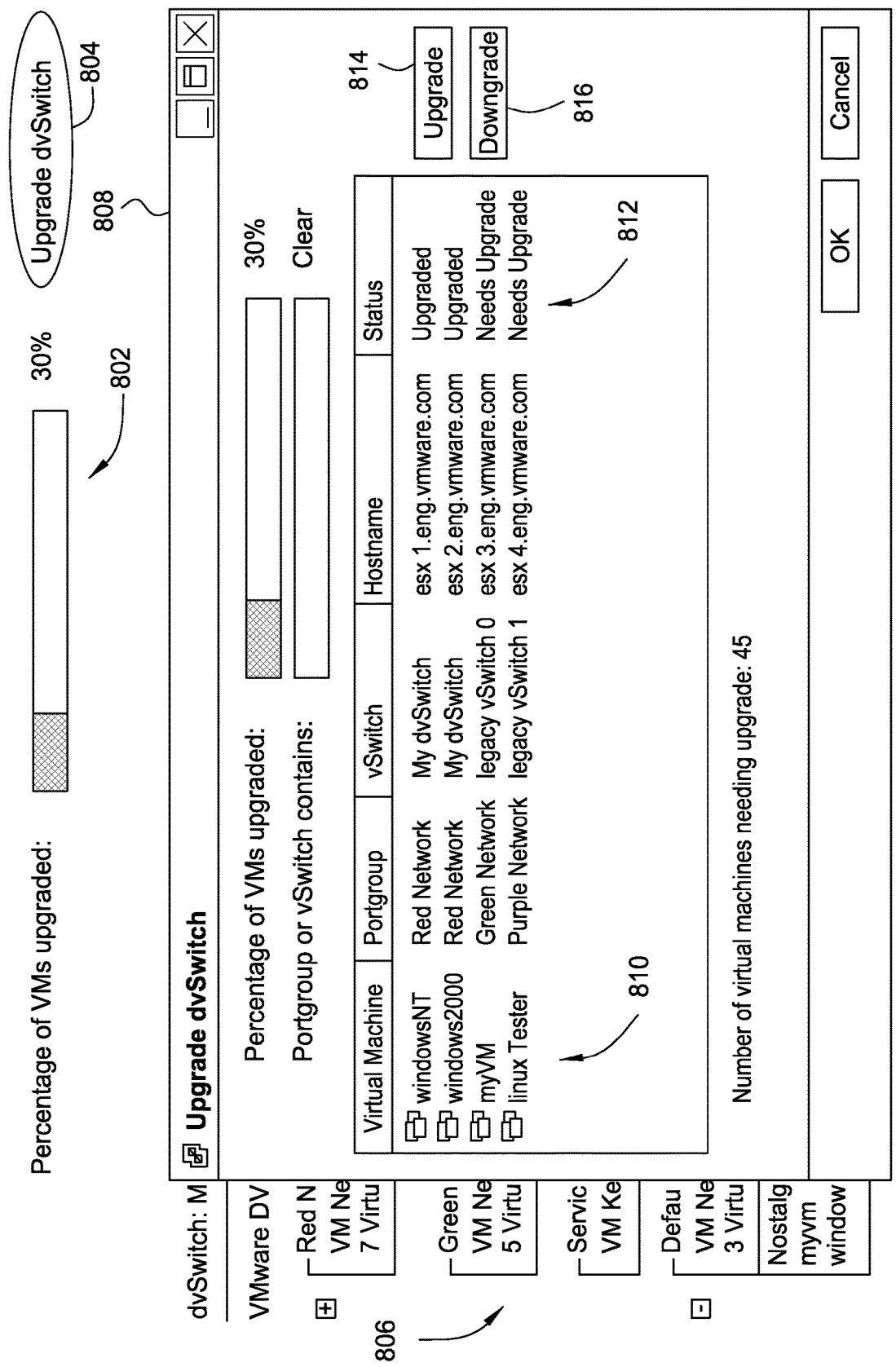
FIG. 8B is a screenshot of a dialog box for migrating VMs from individual virtual switches to a DVS, according to one embodiment of the invention.

The user can select a link 804 to upgrade one or more VMs to the DVS. Selecting the link causes a dialog box to be displayed, as shown in FIG. 8B. FIG. 8B is a screenshot of a dialog box 808 for migrating VMs from individual virtual switches to a DVS, according to one embodiment of the invention. As shown, the dialog box 808 can be displayed over the user interface shown in FIG. 8A. The dialog box can include a list of VMs 810 and the corresponding status 812 of the VMs. In one embodiment, the status may indicate that a particular VM has already been upgraded to the DVS or that the VM still remains to be upgraded. The user can select one or more of the VMs that still remain to be upgraded and can do a "bulk" upgrade to migrate the selected VMs to the DVS by selecting the "Upgrade" link 814. The selected VMs are then automatically migrated to the DVS.

On some occasions, migrating a VM to the DVS may cause unexpected errors in the networking environment. Accordingly, the dialog box 808 also provides a mechanism for users to "downgrade" one or more VMs from the DVS back to the individual virtual switches. The user can select one or more of the VMs that are connected to the DVS and then select the "Downgrade" link 816. The selected VMs are then automatically migrated back to the individual virtual switches.

The user interfaces shown in FIGS. 8A and 8B allow the user to quickly, easily, and safely upgrade VMs from individual virtual switches to a DVS. Using conventional techniques, a user would need to manually modify the networking parameters of each VM individually to migrate the VM to the DVS. Users often have difficulty performing this migration quickly and properly when a large number of VMs are being migrated. Using embodiments of the invention that provide for a user interface for bulk migrations, the process of migrating VMs is much simpler and less error-prone.

As described above, individual port groups, VM networks, or VMs can have associated management policies. Examples of management polices include a load balancing policy (i.e., a policy for managing traffic through a network element), a network failover detection policy, a notification policy (e.g., an Address Resolution Protocol (ARP) notification can be transmitted to the physical NIC to update its MAC address lookup table), a rolling failover policy, a rolling failover policy (i.e., a policy that determines what should occur when a failed adapter comes back online), and/or a failover order policy (i.e., a policy that indicates the order in which network adapters should shut down). The various policies can be set at the DVS level or at the physical NIC level, but can also overridden at the port group level, or even further down at the port level. In one embodiment, a user interface is provided that displays to the user the level at which the policy was set and the level at which the policy is being overridden.

Figure 9:
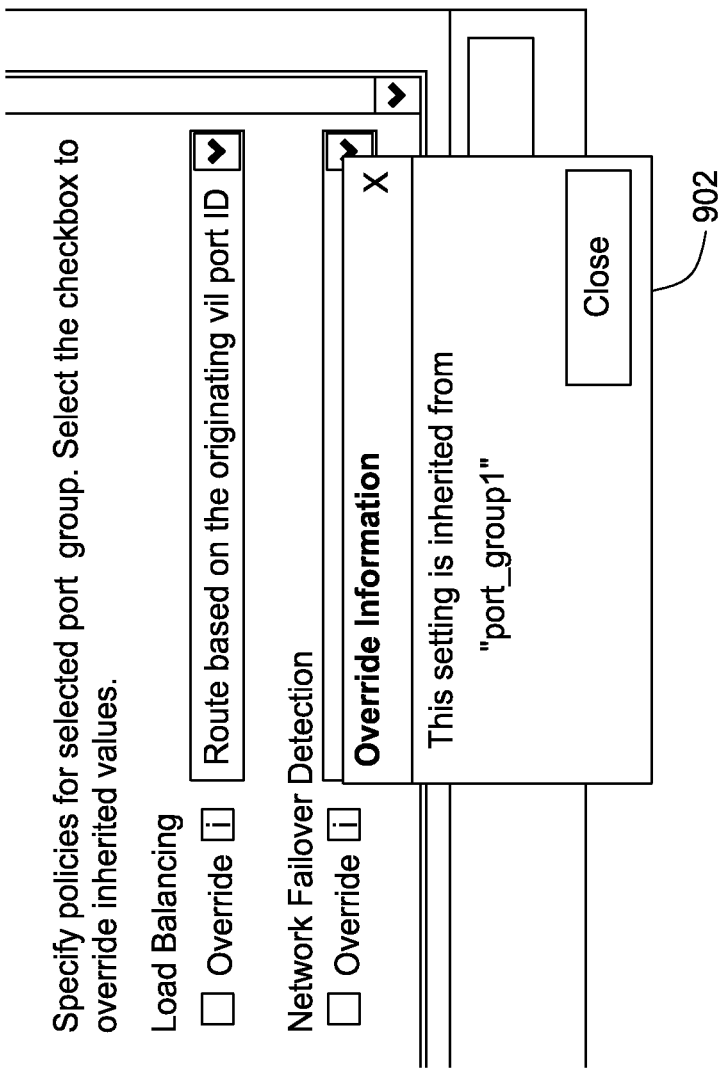
FIG. 9 is a screenshot of user interface that displays policy inheritance, according to one embodiment of the invention.

FIG. 9 is a screenshot of user interface that displays policy inheritance, according to one embodiment of the invention. As shown, the user has selected to override the network failover detection policy. For example, the override may be performed at the port level. When the policy is overridden, a dialog box 902 is displayed that displays the parent level at which the policy was originally set. In the example shown, the network failover detection policy was originally set at the port group level, e.g., at "port_group1." Displaying the policy inheritance in this manner allows the user to quickly determine where the policy was originally defined. The user can then make a determination as to whether the override is properly made at the lower level or whether the policy should be changed at the parent level or levels.

Figure 10:
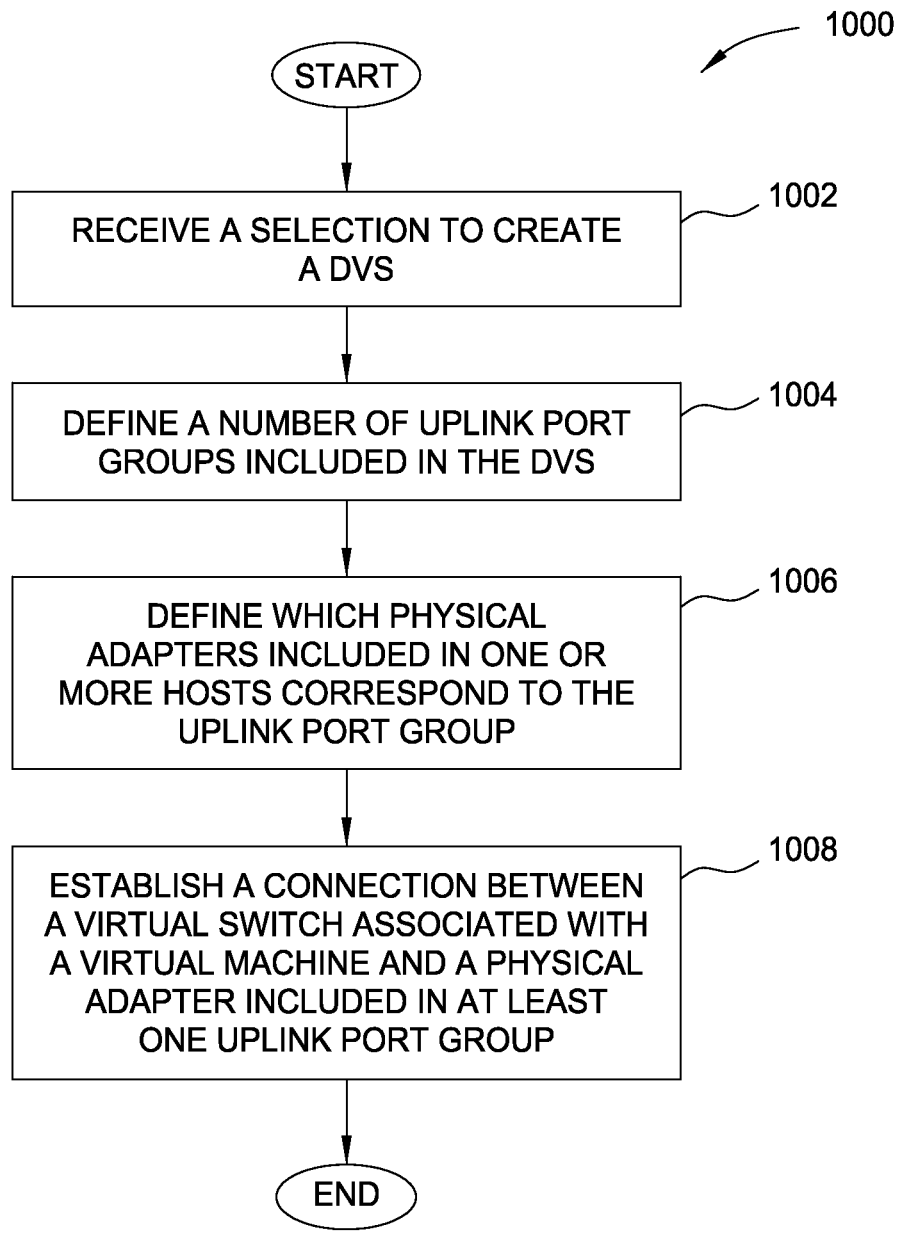
FIG. 10 is a flow diagram of method steps for creating a DVS, according to one embodiment of the invention.

FIG. 10 is a flow diagram of method steps for creating a DVS, according to one embodiment of the invention. Persons skilled in the art would understand that, even though the method 1000 is described in conjunction with the systems of FIGS. 1-9, any system configured to perform the method steps, in any order, is within the scope of embodiments of the invention.

As shown, the method 1000 begins at step 1002, where a processing unit, such as the processing unit that executes the VI client 106, receives a selection to create a DVS. The selection may be made by a user selecting a link or a button to create a DVS. At step 1004, the processing unit defines a number of uplink port groups to be included in the DVS. In one embodiment, at least one uplink port group is automatically created by default. The user can also input a user selection to create additional uplink port groups.

At step 1006, the processor defines which physical adapters included in one or more hosts correspond to the defined uplink port group(s). A graphical user interface can be displayed that allows the user to manually select which physical adapters (i.e., physical NICs) included in the various host computers should be associated with which uplink port groups. In some embodiments, an uplink profile can be established that automatically associates physical adapters to the uplink port groups. For example, assume there are four uplink port groups included in the DVS and four host computers that provide network backing for the DVS. Each host computer may have six physical adapters. An uplink profile can be established that provides that one physical adapter from each of the four host computers is assigned to each of the four uplink port groups. Accordingly, each uplink port group would include four physical adapters, one from each host computer. Also, each host computer would have four of six physical adapters assigned to uplink port groups, with two physical adapters available for other purposes.

At step 1008, the processor establishes a connection between a virtual switch associated with a virtual machine and a physical adapter included in at least one uplink port group. One or more VMs may be included in the virtual computing environment. Step 1008 can be repeated for each VM to establish a connection between the VMs and at least one physical adapter. In some embodiments, a VM can be connected to more than one physical adapter, providing for additional bandwidth. The plurality of physical adapters to which the VM is connected may be included in the same uplink port group or in different uplink port groups. In some embodiments, the user is not required to manually establish the connections between the VMs and the physical adapters. Instead, the processor automatically connects the VMs to the physical adapters.

Figure 11:
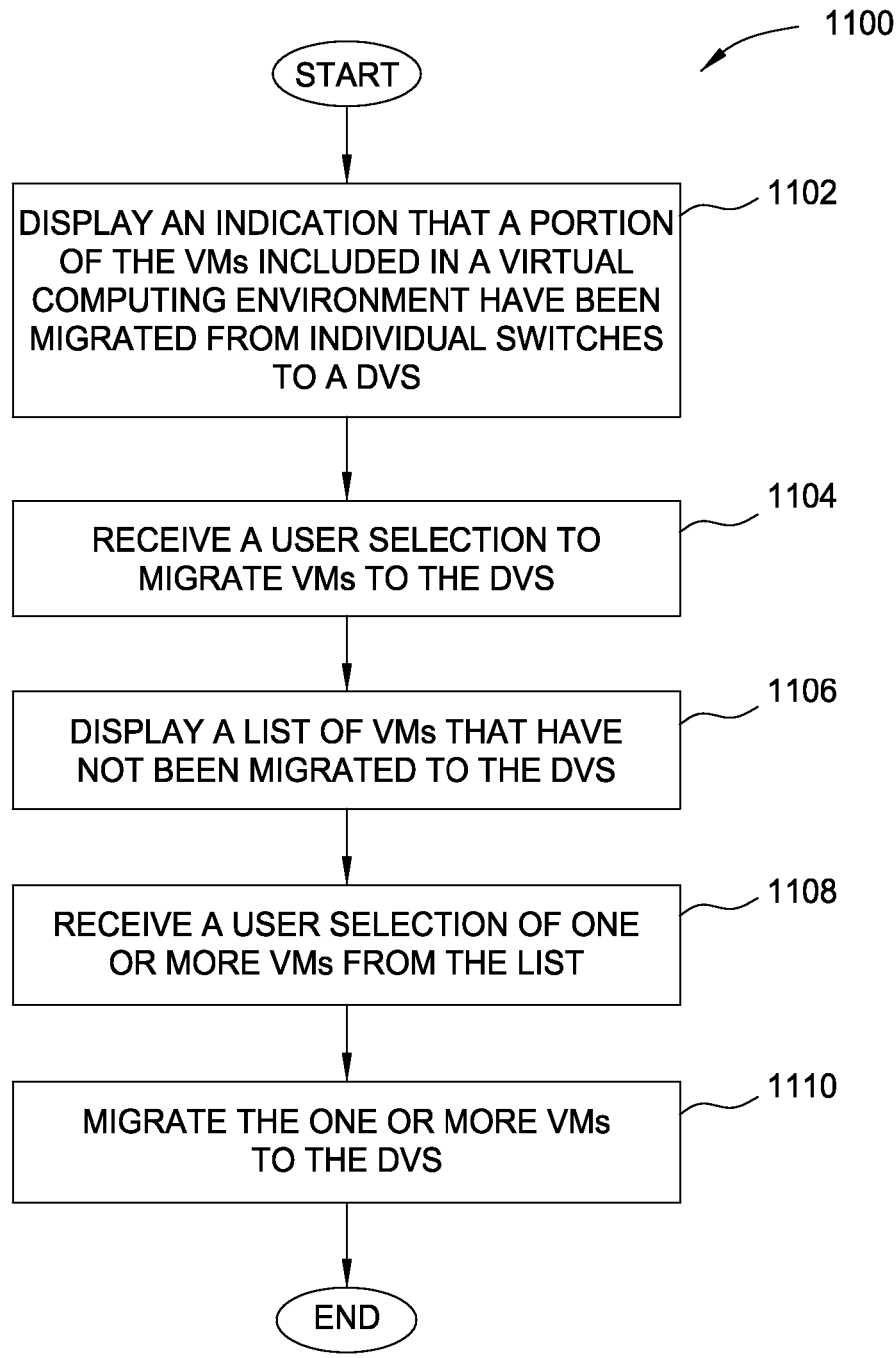
FIG. 11 is a flow diagram of method steps for bulk migration of VMs from individual switches to a DVS, according to one embodiment of the invention.

FIG. 11 is a flow diagram of method steps for bulk migration of VMs from individual switches to a DVS, according to one embodiment of the invention. Persons skilled in the art would understand that, even though the method 1100 is described in conjunction with the systems of FIGS. 1-9, any system configured to perform the method steps, in any order, is within the scope of embodiments of the invention.

As shown, the method 1100 begins at step 1102, where a processing unit, such as the processing unit that executes the VI client 106, displays an indication that a portion of the VMs included in a virtual computing environment have been migrated from individual switches to a DVS. In other words, some of the VMs are still using legacy individual virtual switches. In one embodiment, the indication comprises a status bar, as shown in FIG. 8A. In other embodiments, the indication can be a textual indication (e.g., "21 of 50 VMs need to be migrated to the DVS"). At step 1104, the processor receives a user selection to migrate VMs to the DVS. The user selection may be a selection of a link, such as link 804, to migrate or "upgrade" VMs to the DVS.

At step 1106, the processor displays a list of VMs that have not been migrated to the DVS. In one embodiment, the list of VMs can be displayed in a separate dialog box, as shown in the example in FIG. 8B. At step 1108, the processor receives a user selection of one or more VMs from the list. After the one or more VMs have been selected, the user can select an "Upgrade" or "continue" link, e.g., link 814. At step 1110, the processor migrates the one or more VMs to the DVS. Migrating the one or more VMs can include changing the parameters of the virtual adapters included in the one or more VMs to correspond to one or more uplink ports associated with one or more host computers that provide physical network connections for the DVS. Importantly, the process of migrating VMs to the DVS can be performed "in bulk," where the user does not have to manually change the network parameters of individual VMs to migrate the VMs to the DVS. Performing the migration in bulk provide a much more efficient way for the user migrate the VMs to the DVS.

Figure 12:
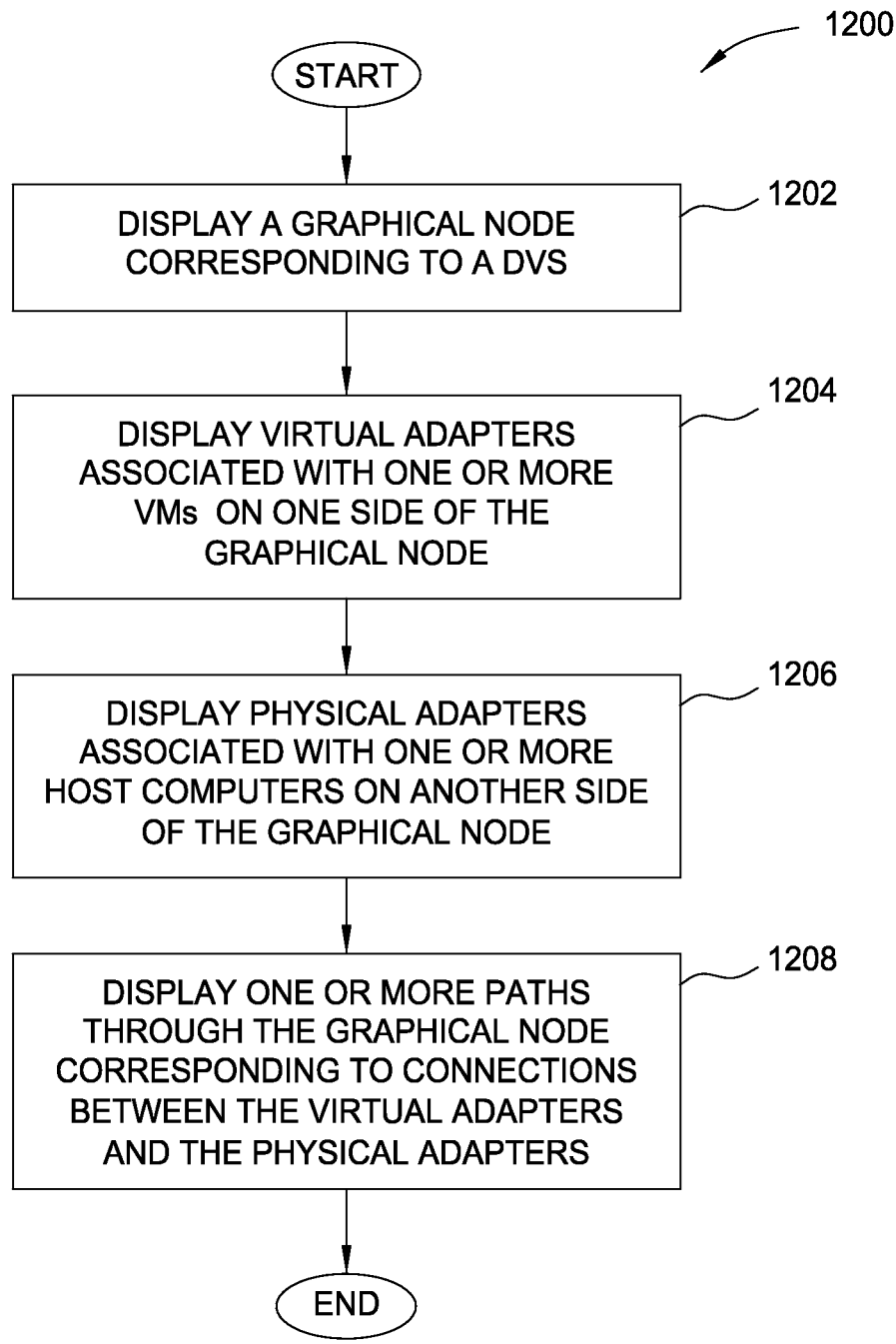
FIG. 12 is a flow diagram of method steps for displaying a graphical view of the DVS, according to one embodiment of the invention.

FIG. 12 is a flow diagram of method steps for displaying a graphical view of the DVS, according to one embodiment of the invention. Persons skilled in the art would understand that, even though the method 1200 is described in conjunction with the systems of FIGS. 1-9, any system configured to perform the method steps, in any order, is within the scope of embodiments of the invention.

As shown, the method 1200 begins at step 1202, where a processing unit, such as the processing unit that executes the VI client 106, displays a graphical node corresponding to a DVS. The graphical node can be a rectangular box, as shown in FIG. 4.

At step 1204, the processor displays virtual adapters associated with one or more VMs on one side of the graphical node. For example, the virtual adapters associated with one or more VMs can be displayed on the left side of the graphical node. As shown in FIG. 4, the virtual adapters associated with one or more VMs are shown on the left side 404. In one embodiment, the virtual adapters can be organized by network connection, e.g., by VLAN.

At step 1204, the processor displays physical adapters associated with one or more host computers on another side of the graphical node. For example, the physical adapters associated with one or more host computers can be displayed on the right side of the graphical node. As shown in FIG. 4, the physical adapters associated with one or more host computers are shown on the right side 406. In one embodiment, the physical adapters can be organized by uplink port.

At step 1204, the processor displays one or more paths through the graphical node corresponding to connections between the virtual adapters and the physical adapters. In some embodiments, the user can select various portions of the display interface to visualize, or "highlight," portions of the virtual networking environment. For example, if the user selects a virtual adapter, then the corresponding physical adapter, as well as the path through the graphical node corresponding to the DVS, can be highlighted. If the user selects a physical adapter, then the corresponding virtual adapters corresponding to one or more VMs, as well as the path through the graphical node corresponding to the DVS, can be highlighted. If the user selects a portion of a path through the DVS, then the corresponding virtual adapters and physical adapters connected to the node can be highlighted.

In further embodiments, the graphical view of the DVS can be organized so that the VMs are displayed arranged by status or bandwidth usage.

In sum, one or more embodiments of the invention provide a user interface for managing a distributed virtual switch. Virtual network adapters associated with one or more virtual machines are logically connected to one or more physical network adapters included in one or more host computers. In one embodiment, the physical network adapters can be organized in uplink port groups. The user interface provides a graphical overview of the virtual computing environment that allows the user to visualize the virtual network, including the connections between the virtual network adapters and the uplink port groups. The user interface also provides a technique for the user to quickly and safely modify the virtual network to migrate virtual machines from individual virtual switches to a distributed virtual switch and/or to modify the arrangement of physical network adapters that provide network backing for the virtual machines.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs), CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

We claim:

1. A non-transitory computer-readable storage medium comprising instructions that, when executed in a computing device, cause the computing device to perform steps comprising:

enabling a graphical user interface to display on a display unit, wherein the graphical user interface manages a virtualized computing environment including a plurality of host computers, each host computer having one or more virtual machines running therein and one or more physical network adapters, and a distributed virtual switch that provides network resources to the one or more virtual machines;

displaying on a first section of the display unit a plurality of uplink port groups and associations between the plurality of uplink port groups and the one or more physical network adapters of the plurality of host computers;

displaying on a second section of the display unit the distributed virtual switch and logical connections between the one or more virtual machines and the plurality of uplink port groups;

receiving a user input, at the graphical user interface, that defines a configuration of a management policy, wherein the management policy is associated with at least one of the one or more virtual machines and the plurality of uplink port groups;

in response to the receiving of the user input, detecting an override by the configuration of the management policy of an established management policy from a higher hierarchy level; and in response to the detecting, displaying on a third section of the display unit, the higher hierarchy level from which a management policy is inherited, wherein the higher hierarchy level is one of a distributed virtual switch level, a physical network adapter level, or an uplink port group level.

2. The non-transitory computer-readable storage medium of claim 1, wherein the steps further include:

displaying on a fourth section of the display unit, each of the uplink port groups separately and a user-selectable link for adding or removing a physical network adapter to or from the corresponding uplink port group; and in response to receiving another user input on the fourth section, modifying the associations between the one or more physical network adapters and the uplink port groups.

3. The non-transitory computer-readable storage medium of claim 1, wherein at least one of the one or more physical network adapters from one of the plurality of host computers is automatically associated with one of the plurality of uplink port groups based on an uplink profile that defines assignments of the one or more physical network adapters to the plurality of uplink port groups, and wherein the uplink profile causes at least one physical network adapter from each of the plurality of host computers to be assigned to each of the plurality of uplink port groups.

4. The non-transitory computer-readable storage medium of claim 1, the steps further comprising:

displaying on a fourth section of the display unit the one or more virtual machines running on the plurality of host computers and statuses of the one or more virtual machines, wherein a first virtual machine is depicted as having a first status, a second virtual machine is depicted as having a second status distinct from the first status, and a third virtual machine is depicted as having a third status distinct from the first and the second statuses, wherein a user selection on one of the one or more virtual machines in the fourth section causes portions of the first, second, and fourth sections to be displayed with a visual distinction to indicate a connection path between the selected one of the one or more virtual machines and a corresponding physical network adapter to which the selected one of the one or more virtual machines is connected.

5. The non-transitory computer-readable storage medium of claim 4, wherein a user selection on one of the one or more physical network adapters in the second section causes portions of the first, second, and fourth sections to be displayed with a visual distinction to indicate a connection path between the selected physical network adapter and a corresponding virtual machine to which the selected physical network adapter is connected.

6. The non-transitory computer-readable storage medium of claim 4, wherein the statuses of the one or more virtual machines include at least one of an on status, an off status, a bad status, an empty status, or a network traffic status.

7. The non-transitory computer-readable storage medium of claim 1, wherein the steps further include displaying on a fourth section of the display unit one or more depictions for modifying the associations between the one or more physical network adapters and the plurality of uplink port groups, and wherein the first and second sections are displayed on a first screen of the graphical user interface and the fourth section is displayed on a second screen of the graphical user interface.

8. The non-transitory computer-readable storage medium of claim 1, wherein the steps further include displaying a screen, on the display unit, that displays an indication that at least one of the one or more virtual machines running on the plurality of host computers are not logically connected to the distributed virtual switch.

9. The non-transitory computer-readable storage medium of claim 8, wherein the indication is a status bar or textual indication.

10. The non-transitory computer-readable storage medium of claim 8, wherein the steps further include displaying a fourth section of the display unit that includes a list of the at least one of the one or more virtual machines that are not logically connected to the distributed virtual switch, the fourth section including a user-selectable link for selecting a set of virtual machines from the list of the at least one of the one or more virtual machines to cause the virtual machines included in the set of virtual machines to become logically connected to the distributed virtual switch.

11. The non-transitory computer-readable storage medium of claim 1, wherein at least one of the one or more physical network adapters from one of the plurality of host computers is automatically associated with one of the plurality of uplink port groups based on an uplink profile that defines assignments of the one or more physical network adapters to the plurality of uplink port groups.

12. The non-transitory computer-readable storage medium of claim 1, wherein the first section further depicts statuses of the one or more physical network adapters of the plurality of host computers and permits a user to manage the statuses of the one or more physical network adapters.

13. A method of displaying on a display unit, a graphical user interface for managing a virtualized computing environment including a plurality of host computers, each having one or more virtual machines running therein and one or more physical network adapters, and configured with a distributed virtual switch for providing network resources to the one or more virtual machines, said method comprising:

displaying on the display unit a first section that depicts uplink port groups and associations between the uplink port groups and the physical network adapters of the plurality of host computers; and displaying on the display unit a second section that depicts the distributed virtual switch and logical connections between the one or more virtual machines and the uplink port groups, wherein at least one of the physical network adapters from one of the host computers is automatically associated with one of the uplink port groups based on an uplink profile that defines one or more rules by which assignments of the physical network adapters to the uplink port groups are automatically determined, wherein at least one rule of the one or more rules does not identify any particular physical network adapter, and wherein the at least one rule causes at least one physical network adapter from each of the plurality of host computers to be assigned to each of the uplink port groups, wherein the uplink profile is automatically used as a default configuration of a new host computer other than the plurality of host computers upon the new host computer being added to the distributed virtual switch.

14. The method of claim 13, further comprising, displaying on the display unit a third section for modifying the associations between the physical network adapters and the uplink port groups, wherein the third section depicts each of the uplink port groups separately and displays a user-selectable link for adding or removing a physical network adapter to or from the corresponding uplink port group.

15. The method of claim 13, further comprising:

displaying on the display unit a third section that depicts, on the display unit, the virtual machines running on the plurality of host computers and statuses of the virtual machines, wherein a first virtual machine is depicted as having a first status, a second virtual machine is depicted as having a second status distinct from the first status, and a third virtual machine is depicted as having a third status distinct from the first and the second statuses, wherein a user selection on one of the virtual machines in the third section causes portions of the first, second, and third sections to be displayed with a visual distinction to indicate a connection path between the selected one of the virtual machines and a corresponding physical network adapter to which the selected one of the virtual machines is connected, and wherein a user selection on one of the physical network adapters in the first section causes portions of the first, second, and third sections to be displayed with a visual distinction to indicate a connection path between the selected physical network adapter and a corresponding virtual machine to which the selected physical network adapter is connected.

16. The method of claim 13, further comprising, displaying on the display unit a third section for modifying the associations between the physical network adapters and the uplink port groups, wherein the first and second sections are displayed on a first screen of the graphical user interface and the third section is displayed on a second screen of the graphical user interface.

17. The method of claim 13, wherein the graphical user interface further includes a screen displayed, on the display unit, that displays an indication that one or more virtual machines running on the plurality of host computers are not logically connected to the distributed virtual switch.

18. The method of claim 17, wherein the graphical user interface further includes a third section displayed, on the display unit, that includes a list of the one or more virtual machines that are not logically connected to the distributed virtual switch, the third screen including a user-selectable link for selecting a set of virtual machines from the list of one or more virtual machines to cause the virtual machines included in the set of virtual machines to become logically connected to the distributed virtual switch.

19. A computing device, comprising:
a graphical user interface;
a memory comprising executable instructions; and
a processor in data communication with the memory and configured to execute the instructions to enable the graphical user interface to be displayed on a display unit, wherein the graphical user interface is for managing a virtualized computing environment including a plurality of host computers, each having one or more virtual machines running therein and one or more physical network adapters, and configured with a distributed virtual switch for providing network resources to the one or more virtual machines, said graphical user interface comprising:
a first section that depicts, on the display unit, uplink port groups and associations between the uplink port groups and the physical network adapters of the plurality of host computers; and
a second section that depicts, on the display unit, the distributed virtual switch and logical connections between the one or more virtual machines and the uplink port groups, wherein at least one of the physical network adapters from one of the host computers is automatically associated with one of the uplink port groups based on an uplink profile that defines one or more rules by which assignments of the physical network adapters to the uplink port groups are automatically determined, wherein at least one rule of the one or more rules does not identify any particular physical network adapter, and wherein the at least one rule causes at least one physical network adapter from each of the plurality of host computers to be assigned to each of the uplink port groups;
wherein the uplink profile is automatically used as a default configuration of a new host computer other than the plurality of host computers upon the new host computer being added to the distributed virtual switch.

\* \* \* \* \*